(12) United States Patent
Jeffery et al.

(10) Patent No.: US 9,497,781 B2
(45) Date of Patent: *Nov. 15, 2016

(54) SYSTEM AND METHOD FOR CO-LOCATED AND CO-CHANNEL WI-FI ACCESS POINTS

(71) Applicant: Magnolia Broadband Inc., Englewood, NJ (US)

(72) Inventors: Stuart S. Jeffery, Los Altos, CA (US); Haim Harel, New York, NY (US); Kenneth Kludt, San Jose, CA (US)

(73) Assignee: MAGNOLIA BROADBAND INC., Englewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,640

(22) Filed: Feb. 5, 2014

(65) Prior Publication Data

US 2015/0049680 A1 Feb. 19, 2015

Related U.S. Application Data

(60) Provisional application No. 61/865,462, filed on Aug. 13, 2013.

(51) Int. Cl.
*H04W 74/08* (2009.01)
*H04W 88/08* (2009.01)
*H04W 84/12* (2009.01)

(52) U.S. Cl.
CPC ......... *H04W 74/0816* (2013.01); *H04W 84/12* (2013.01); *H04W 88/08* (2013.01)

(58) Field of Classification Search
CPC ............. H04W 74/06; H04W 72/0426; H04W 74/08; H04W 74/0808; H04W 74/0816
(Continued)

(56) References Cited

U.S. PATENT DOCUMENTS 4,044,359 A 8/1977 Applebaum et al.
4,079,318 A 3/1978 Kinoshita
(Continued)

FOREIGN PATENT DOCUMENTS

EP 1 189 303 3/2002
EP 1 867 177 5/2010
(Continued)

OTHER PUBLICATIONS

Office Action issued by the United States Patent and Trademark Office for U.S. Appl. No. 13/630,146 dated Jan. 22, 2013.
(Continued)

*Primary Examiner* — Scott M Sciacca
(74) *Attorney, Agent, or Firm* — Pearl Cohen Zedek Latzer Baratz LLP

(57) ABSTRACT

A wireless communication system may include a plurality of co-located transceivers. The plurality of transceivers may be configured to transmit data to at least one user equipment, according to a collision sense multiple access/collision avoidance (CSMA/CA) protocol. A processor may receive a signal preamble and a sender address of the signal preamble and determine whether the sender address is included in the stored list of addresses. If the sender address is included in the stored list of addresses, the processor may allow simultaneous data transmission from two or more of the co-located transceivers.

17 Claims, 7 Drawing Sheets

(58) Field of Classification Search
USPC .................................................. 370/445, 448
See application file for complete search history.

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,094,165 A | 7/2000 | Smith | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,647,276 B1 | 11/2003 | Kuwahara et al. | |
| 6,697,622 B1 | 2/2004 | Ishikawa et al. | |
| 6,697,633 B1 | 2/2004 | Dogan et al. | |
| 6,735,182 B1 | 5/2004 | Nishimori et al. | |
| 6,834,073 B1 | 12/2004 | Miller et al. | |
| 6,842,460 B1 | 1/2005 | Olkkonen et al. | |
| 6,914,890 B1 | 7/2005 | Tobita et al. | |
| 6,927,646 B2 | 8/2005 | Niemi | |
| 6,934,541 B2 | 8/2005 | Miyatani | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,154,960 B2 | 12/2006 | Liu et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,876,848 B2 | 1/2011 | Han et al. | |
| 7,881,401 B2 | 2/2011 | Kraut et al. | |
| 7,898,478 B2 | 3/2011 | Niu et al. | |
| 7,904,086 B2 | 3/2011 | Kundu et al. | |
| 7,904,106 B2 | 3/2011 | Han et al. | |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,111,782 B2 | 2/2012 | Kim et al. | |
| 8,115,679 B2 | 2/2012 | Falk | |
| 8,155,613 B2 | 4/2012 | Kent et al. | |
| 8,194,602 B2 | 6/2012 | van Rensburg et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,504,098 B2 | 8/2013 | Khojastepour | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,571,127 B2 | 10/2013 | Jiang et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,605,658 B2 | 12/2013 | Fujimoto | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,670,504 B2 | 3/2014 | Naguib | |
| 8,744,511 B2 | 6/2014 | Jones et al. | |
| 8,754,810 B2 | 6/2014 | Guo et al. | |
| 8,767,862 B2 | 7/2014 | Abreu et al. | |
| 8,780,743 B2 | 7/2014 | Sombrutzki et al. | |
| 8,797,969 B1 | 8/2014 | Harel et al. | |
| 8,891,598 B1 | 11/2014 | Wang et al. | |
| 8,928,528 B2 | 1/2015 | Harel et al. | |
| 8,942,134 B1 | 1/2015 | Kludt et al. | |
| 8,976,845 B2 | 3/2015 | O'Keeffe et al. | |
| 8,995,416 B2 | 3/2015 | Harel et al. | |
| 9,014,066 B1 | 4/2015 | Wang et al. | |
| 9,035,828 B2 | 5/2015 | O'Keeffe et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1* | 5/2003 | Kim et al. | 455/453 |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0085266 A1 | 4/2005 | Narita | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1* | 11/2005 | Cave et al. | 370/445 |
| 2005/0265436 A1 | 12/2005 | Suh et al. | |
| 2005/0286440 A1* | 12/2005 | Strutt et al. | 370/253 |
| 2005/0287962 A1 | 12/2005 | Mehta et al. | |
| 2006/0041676 A1 | 2/2006 | Sherman | |
| 2006/0092889 A1 | 5/2006 | Lyons et al. | |
| 2006/0094372 A1 | 5/2006 | Ahn et al. | |

(56) References Cited

U.S. PATENT DOCUMENTS

| | | |
|---|---|---|
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1* | 5/2007 | Wentink ............ 370/329 |
| 2007/0115914 A1 | 5/2007 | Ohkubo et al. |
| 2007/0152903 A1 | 7/2007 | Lin et al. |
| 2007/0217352 A1* | 9/2007 | Kwon ............ 370/312 |
| 2007/0223380 A1 | 9/2007 | Gilbert et al. |
| 2007/0223525 A1* | 9/2007 | Shah ............ H04W 72/02 370/468 |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1 | 5/2008 | Gallagher et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1* | 7/2009 | Sherman ............ 709/226 |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0279478 A1 | 11/2009 | Nagaraj et al. |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1* | 12/2009 | Adachi et al. ............ 370/329 |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1* | 8/2010 | Zhang ............ 370/329 |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1* | 6/2011 | Fujimoto ............ 375/224 |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1* | 2/2012 | Wentink ............ 370/338 |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1* | 3/2012 | Taki et al. ............ 370/338 |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1* | 4/2012 | Mohebbi ............ 455/15 |
| 2012/0115523 A1 | 5/2012 | Shpak |
| 2012/0155349 A1* | 6/2012 | Bajic et al. ............ 370/311 |
| 2012/0155397 A1* | 6/2012 | Shaffer et al. ............ 370/329 |
| 2012/0163257 A1* | 6/2012 | Kim et al. ............ 370/310 |
| 2012/0163302 A1* | 6/2012 | Takano ............ 370/328 |
| 2012/0170453 A1* | 7/2012 | Tiwari ............ 370/230 |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1* | 8/2012 | Koo et al. ............ 370/229 |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1* | 11/2012 | Struhsaker et al. ......... 370/280 |
| 2012/0314570 A1 | 12/2012 | Forenza et al. |
| 2012/0321015 A1 | 12/2012 | Hansen et al. |
| 2012/0327870 A1* | 12/2012 | Grandhi et al. ............ 370/329 |
| 2013/0010623 A1 | 1/2013 | Golitschek |
| 2013/0012134 A1 | 1/2013 | Jin et al. |
| 2013/0017794 A1 | 1/2013 | Kloper et al. |
| 2013/0023225 A1 | 1/2013 | Weber |
| 2013/0044877 A1* | 2/2013 | Liu et al. ............ 380/270 |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1* | 6/2013 | Debnath et al. ............ 370/336 |

(56) References Cited

U.S. PATENT DOCUMENTS

| | | | |
|---|---|---|---|
| 2013/0156120 | A1 | 6/2013 | Josiam et al. |
| 2013/0170388 | A1 | 7/2013 | Ito et al. |
| 2013/0172029 | A1 | 7/2013 | Chang et al. |
| 2013/0188541 | A1* | 7/2013 | Fischer .................. 370/311 |
| 2013/0190006 | A1 | 7/2013 | Kazmi et al. |
| 2013/0208587 | A1 | 8/2013 | Bala et al. |
| 2013/0208619 | A1 | 8/2013 | Kudo et al. |
| 2013/0223400 | A1 | 8/2013 | Seo et al. |
| 2013/0229996 | A1 | 9/2013 | Wang et al. |
| 2013/0229999 | A1 | 9/2013 | Da Silva et al. |
| 2013/0235720 | A1 | 9/2013 | Wang et al. |
| 2013/0242853 | A1 | 9/2013 | Seo et al. |
| 2013/0242899 | A1 | 9/2013 | Lysejko et al. |
| 2013/0242965 | A1* | 9/2013 | Horn et al. ............. 370/338 |
| 2013/0242976 | A1 | 9/2013 | Katayama et al. |
| 2013/0252621 | A1 | 9/2013 | Dimou et al. |
| 2013/0272437 | A1 | 10/2013 | Eidson et al. |
| 2013/0301551 | A1 | 11/2013 | Ghosh et al. |
| 2013/0304962 | A1* | 11/2013 | Yin et al. .............. 711/102 |
| 2013/0331136 | A1 | 12/2013 | Yang et al. |
| 2013/0343369 | A1 | 12/2013 | Yamaura |
| 2014/0010089 | A1* | 1/2014 | Cai et al. ............... 370/241 |
| 2014/0010211 | A1* | 1/2014 | Asterjadhi et al. ........ 370/336 |
| 2014/0029433 | A1* | 1/2014 | Wentink ................ 370/236 |
| 2014/0071873 | A1 | 3/2014 | Wang et al. |
| 2014/0079016 | A1* | 3/2014 | Dai et al. ............... 370/329 |
| 2014/0086077 | A1 | 3/2014 | Safavi |
| 2014/0086081 | A1 | 3/2014 | Mack et al. |
| 2014/0098681 | A1* | 4/2014 | Stager et al. ............ 370/252 |
| 2014/0119288 | A1* | 5/2014 | Zhu et al. ............... 370/329 |
| 2014/0185501 | A1* | 7/2014 | Park et al. .............. 370/311 |
| 2014/0185535 | A1 | 7/2014 | Park et al. |
| 2014/0192820 | A1 | 7/2014 | Azizi et al. |
| 2014/0204821 | A1* | 7/2014 | Seok et al. ............. 370/311 |
| 2014/0241182 | A1 | 8/2014 | Smadi |
| 2014/0242914 | A1 | 8/2014 | Monroe |
| 2014/0269409 | A1 | 9/2014 | Dimou et al. |
| 2014/0307653 | A1 | 10/2014 | Liu et al. |
| 2015/0016438 | A1 | 1/2015 | Harel et al. |
| 2015/0018042 | A1 | 1/2015 | Radulescu et al. |
| 2015/0085777 | A1 | 3/2015 | Seok |
| 2015/0124634 | A1 | 5/2015 | Harel et al. |
| 2015/0139212 | A1 | 5/2015 | Wang et al. |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.

(56) References Cited

OTHER PUBLICATIONS

Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, No. Ljubljana; 20090107, Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, No. Valencia, Spain; 20100118, Jan. 12, 2010, pp. 1-5.
Notice of Allowance issued by the United States Patent and Trademark Office for U.S. Appl. No. 13/925,454 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.

(56) References Cited

OTHER PUBLICATIONS

Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International Application No. PCT/US2014/062116 dated Jun. 22, 2015.
Office Action issued by the United States Patent and Trademark Office for U.S. Appl. No. 14/467,415 dated Jun. 30, 2015.
International Search Report and Written Opinion for PCT International Application No. PCT/US2014/063304 dated Jul. 8, 2015.
Bandyopadhyay, S. et al., "An Adaptive MAC Protocol for Wireless Ad Hoc Community Network (WACNet) Using Electronically Steerable Passive Array Radiator Antenna", Globecom '01 : IEEE Global Telecommunications Conference; San Antonio, Texas, USA, Nov. 25-29, 2001, IEEE Operations Center, Piscataway, NJ, vol. 5, Nov. 25, 2001, pp. 2896-2900.
Du, Yongjiu et al., "iBeam: Intelligent Client-Side Multi-User Beamforming in Wireless Networks", IEEE INFOCOM 2014—IEEE Conference on Computer Communications, IEEE, Apr. 27, 2014, pp. 817-825.
Office Action issued by the United States Patent and Trademark Office for U.S. Appl. No. 13/888,057 dated Jul. 9, 2015.
Office Action issued by the United States Patent and Trademark Office for U.S. Appl. No. 14/517,114 dated Jul. 28, 2015.
Office Action issued by the United States Patent and Trademark Office for U.S. Appl. No. 14/672,634 dated Aug. 12, 2015.
Notice of Allowance issued by the United States Patent and Trademark Office for U.S. Appl. No. 14/543,357 dated Sep. 2, 2015.
Office Action issued by the United States Patent and Trademark Office for U.S. Appl. No. 14/450,625 dated Sep. 10, 2015.
Office Action issued by the United States Patent and Trademark Office for U.S. Appl. No. 14/320,920 dated Sep. 21, 2015.
Office Action issued by the United States Patent and Trademark Office for U.S. Appl. No. 14/181,844 dated Sep. 25, 2015.

\* cited by examiner

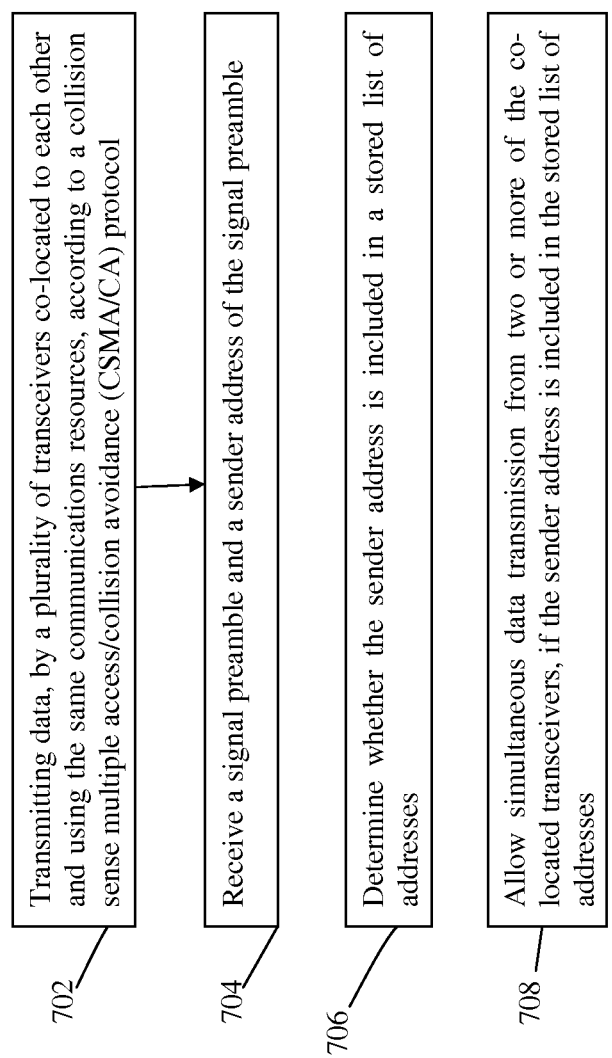

SYSTEM AND METHOD FOR CO-LOCATED AND CO-CHANNEL WI-FI ACCESS POINTS

CROSS REFERENCE TO RELATED APPLICATIONS

This application claims benefit of U.S. Provisional Patent Application No. 61/865,462 filed on Aug. 13, 2013 which is incorporated herein by reference in its entirety.

FIELD OF THE PRESENT INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND

Active antenna systems may implement 1-dimensional and 2-dimensional multi-beam base stations that focus transmission and reception into narrow sub-sectors, facilitate reduced interference to neighboring cells, and enable reuse of the radio spectrum at its own cell by activating independent simultaneous co-channel non-overlapping beams.

Base stations may separate transmission and reception by using different frequencies or different time divisions for transmission and reception. For example, cellular protocols, such as GSM (Global System for Mobile Communications), WiMAX (Worldwide Interoperability for Microwave Access), and LTE (Long-Term Evolution), may sync (synchronize) all transmission and receiving channels using time-division. WiFi base stations, which may incorporate a multi-beamforming cluster of co-located, co-channel Wi-Fi access points, may not inherently include such syncing capabilities and may operate inefficiently when in close proximity, due to the nature of the CSMA/CA (Carrier sense multiple access with collision avoidance) property of the Wi-Fi protocol, which requires yielding to all first-come Wi-Fi data transmission in order to avoid transmission collisions or jamming. While co-located, co-channel Wi-Fi access points may provide super-isolation of data transmission via RF manipulation methods, performance may be improved by distinguishing between identified channel capturing signals originated locally (e.g., from another AP in the same cluster) and originated remotely (e.g., signals coming from UEs or non-cluster APs).

SUMMARY

A wireless communication system may include a plurality of co-located transceivers. The plurality of transceivers may be configured to transmit data to at least one user equipment, according to a collision sense multiple access/collision avoidance (CSMA/CA) protocol. A processor may receive a signal preamble and a sender address of the signal preamble and determine whether the sender address is included in the stored list of addresses. If the sender address is included in the stored list of addresses, the processor may allow simultaneous data transmission from two or more of the co-located transceivers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a flowchart for a method according to an embodiment of the invention.

Figure 1:
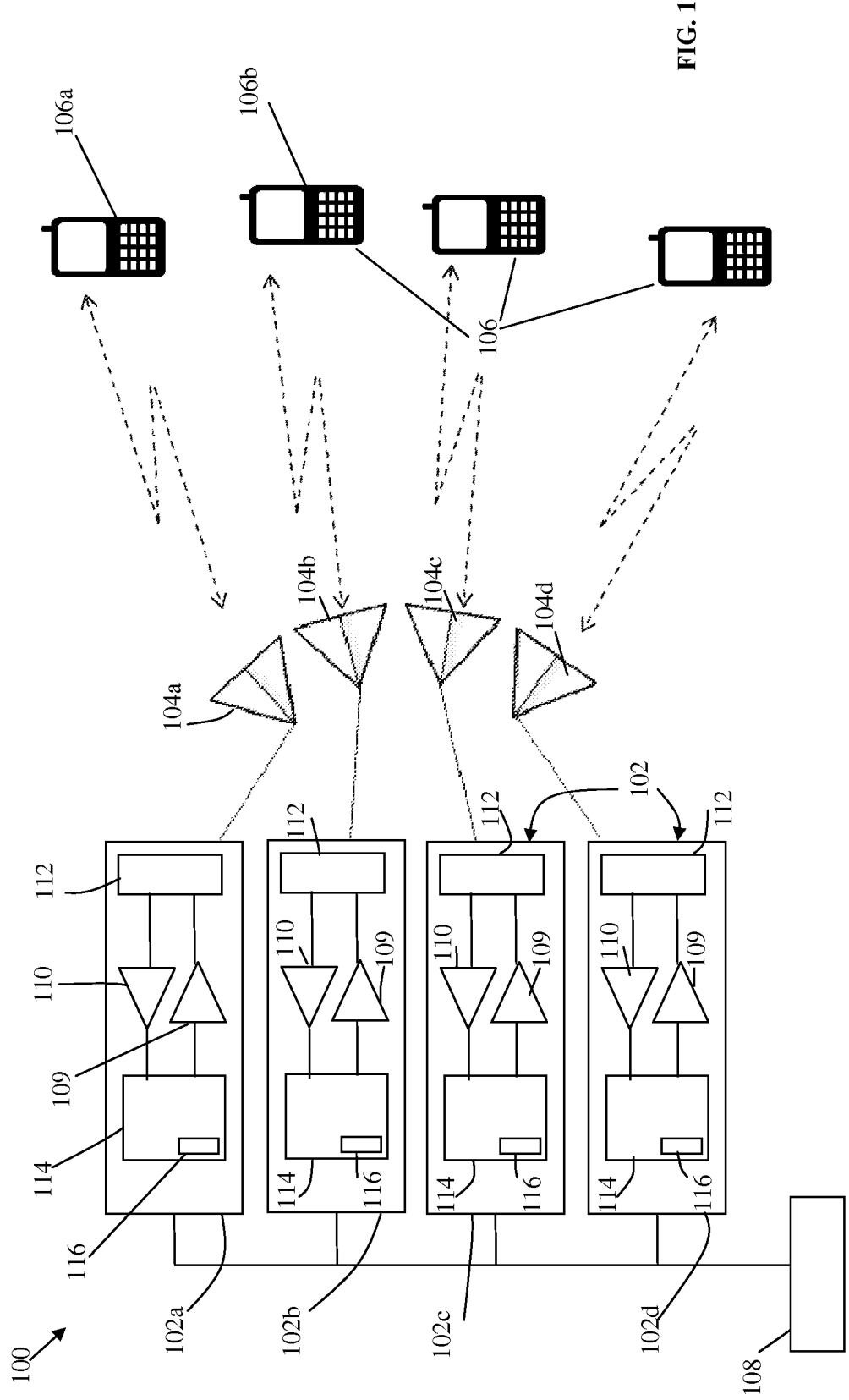
FIG. 1 is an illustration of a Multibeam Access Point or base station with four beamforming transceivers or access points transmitting on one or the same frequency channel.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may be described in reference to the IEEE (Institute of Electrical and Electronics Engineer) 802.11 standard for implementing wireless local area networks (WLAN). "802.11xx" may refer to any version of the 802.11 standard, such as 802.11a, 802.11g, or 802.11ac, for example. Versions of the 802.11 standard may operate using a technique called Collision Sense Multiple Access/Collision Avoidance (CSMA/CA), a networking method which aims to prevent transmission collisions before they occur. While embodiments of the invention are described in terms of the 802.11 protocol, other network protocols built on the CSMA/CA concept may be used.

Access points (AP's) using a CSMA/CA wireless network, including IEEE 802.11 WiFi networks, may determine whether a radio channel is clear, prior to broadcasting or transmitting data in the channel. The AP may do this by performing a clear channel assessment (CCA), which includes two functions: listening to received energy on an RF interface (termed "energy detection"), or detecting and decoding an incoming Wi-Fi signal preamble from a nearby AP. For energy detection, the AP may delay signal or data transmission if it detects an energy level predetermined by the 802.11 protocol. For preamble detection, a signal preamble may be a signal used to synchronize transmission timing between two devices and may occur at the beginning of every data packet. In a communication standard such as Wi-Fi, a preamble may have a predefined structure and data fields organized in a way that all devices communicating on the standard understand. A CCA is deemed 'busy' and thus not available if an AP's receiver can sense radio energy, from another AP, above a CCA sensitivity level or if an AP detects an incoming WiFi signal preamble. The AP may also maintain a Network Allocation Vector (NAV), which acts as a countdown timer to when the AP may begin to transmit data. Based on signals from nearby AP's which may indicate the length of a transmitted data packet, an AP's NAV may update the time to transmission, causing further delay to an AP's data transmission. An AP may defer from using the channel to transmit data until both conditions (e.g., CCA deemed 'busy' and the NAV timer) have expired.

AP's or transceivers operating in according with CSMA/CA protocols may also implement a backoff procedure to further delay transmission until no other nearby AP's are transmitting. When an AP desires to transmit right after a NAV counter has reached zero, there may be other AP's in the area with NAV counters or timers reaching zero at the same time. Thus, more than one AP may desire to transmit simultaneously. If this occurs and the AP's detect each other, according to a CSMA/CA protocol, a backoff procedure may introduce a pseudo-random amount of time or delay for both of the AP's that desire to transmit. This may normally ensure that each AP delays transmission for a different amount of time, so that when one AP's backoff counter has reached zero, it is more likely to be able to transmit without interference, since the other nearby AP may still be waiting until its backoff counter or timer has reached zero. However, both AP's may still check to determine whether the channel is available before transmitting or whether another backoff procedure may be required.

Embodiments of the invention may describe an enhancement to the operation of CSMA/CA (Collision Sense Multiple Access/Collision Avoidance) radio networks by, for example, increasing the carrying capacity CSMA/CA networks which incorporate directional antennas. For example, a Multibeam Access Point, which may act as a Wi-Fi base station, may include a cluster of co-located Wi-Fi access points or transceivers, each access point with independent transmit and receive capabilities. As used herein, transceiver and AP may be used interchangeably as any device having independent transmit and receive functions and capable of acting as an 802.11xx access point. Each access point or transceiver may use directive antennas to focus the radio energy on an azimuth covering an intended user on a user equipment (UE), enabling one or the same radio frequency or frequency channel (e.g., the same or overlapping frequency spectrum) to be used simultaneously or concurrently on a different azimuth beam which points to a different UE. Transceivers or access points may be co-located if, under ordinary usage of the CSMA/CA technique, data transmission from one transceiver prevents simultaneous data transmission from another transceiver on the same channel or frequency. The transceivers' co-location or proximity to each other may cause, for example, RF interference, a busy CCA resulting in an updated NAV, or activation of a backoff procedure. Co-located transceivers may be clustered or grouped together into one base station that serves UE's in a limited geographical area. Co-located transceivers may share processing tasks or may each have separate processing capabilities. Embodiments of the invention may, for example, alter the operation of CSMA/CA techniques to minimize interference between the co-located transceivers.

FIG. 1 is an illustration of a Multibeam Access Point or base station 100 with four beamforming transceivers 102a-d or access points transmitting on the same channel or frequency channel. Other base stations may include more or fewer access points, but no less than two. Each transceiver or access point 102a-d may be coupled to an antenna 104a-d, and each antenna 104a-d may form directive beams 105 to transmit data to a UE 106. A UE 106 may be a cell phone, smart phone, tablet or any device with Wi-Fi capability and able to communicate with a Wi-Fi access point, or another wireless capable device. UE's 106 may be recognized in a WLAN as a Station (STA) device, according to the IEEE 802.11xx protocol. Each transceiver 102a-d may operate according to the IEEE 802.11xx protocol, or other protocol using CSMA/CA. Transceivers 102a-d may use or share the same frequency resources by being able to communicate on the same frequency or frequency channel, such as channel 6 on the 2.4 GHz band, for example. Other channels or frequencies may be used. A controller 108 may interface with or control each transceiver 102a-d. The transceivers 102a-d may each include for example a transmitter 109, receiver 110, antenna interface or RF circuitry 112, and a processor 114 and memory 116, although other or different equipment may be used. Processor 114 may be a general purpose processor configured to perform embodiments of the invention by executing code or software stored in memory 116, or may be other processors, e.g. a dedicated processor.

Due to the properties of the IEEE 802.11 protocol, transceivers 102 co-located on one base station 100 and communicating with UE's 106 on the same frequency channel may be prevented or suppressed from transmitting data simultaneously due to a CCA energy detection or preamble detection, as explained above. For example, a first transceiver 102a may desire to transmit data on a channel to a UE 106a, and it may first determine if the channel is being used by another transceiver 102b nearby. Through a CCA, the first transceiver 102a may detect that the second transceiver 102b is currently transmitting to a second UE 106b. Although data transmission between the second transceiver 102b and the second UE 106b should not affect data transmission between the first transceiver 102a and 106a, the 802.11 protocol may require the first transceiver 102a to delay transmission until the second transceiver 102b is finished transmitting. With other transceivers 102c and 102d at the base station 100, the first transceiver 102a which desires to transmit may, according to the 802.11 standard, be required to delay transmission until all other transceivers 102c and 102d have finished transmitting on the same frequency.

Depending on the frequency of data transmission, energy detection thresholds may vary. For example, the 802.11 standard may require that transceivers 102a-d delay data transmission if they detect power levels from other nearby transceivers of −62 dBm at 20 MHz, −59 dBm at 40 MHz, or −56 dBm at 80 MHz. Thus, the minimum signal to trigger any energy detection may be −62 dBm. If, for example, the antennas 104a-d transmit at +22 dBm power, and three active transceivers contribute 10*log(3) dBm or +4.7 dBm, a minimum isolation required between each of the transceivers may be 93.7 dBm (e.g., 67 dBm+22 dBm+4.7 dBm). Adding in an error margin, a minimum isolation between each of the transceivers 102a-d may be 100 dBm with 6.3 dBm error tolerance. While such isolation may deter against delay due to energy detection, the isolation may not be enough to prevent a preamble detection from delaying data transmission. Since preambles may be sent at a higher power of about 14 dBm, receiver 110 of each co-located AP 102a-d may still detect a preamble even with RF and antenna isolation. Further, uncontrollable environmental conditions may affect RF isolation between transceivers 102a-d, and interference may be exacerbated when multiple transceivers are added to the MBAP.

For preamble detection, a first transceiver 102a may update its NAV timer based on a preamble received from another co-located transceiver (e.g., 102b, 102c, or 102d) and withhold transmission for a period described in the NAV. Embodiments of the invention, described herein, may adjust the response to the 802.11 protocol between co-located Wi-Fi transceivers, yet follow the protocol in response to incoming signals from Wi-Fi transceivers from other base stations or from UE's.

Figure 2:
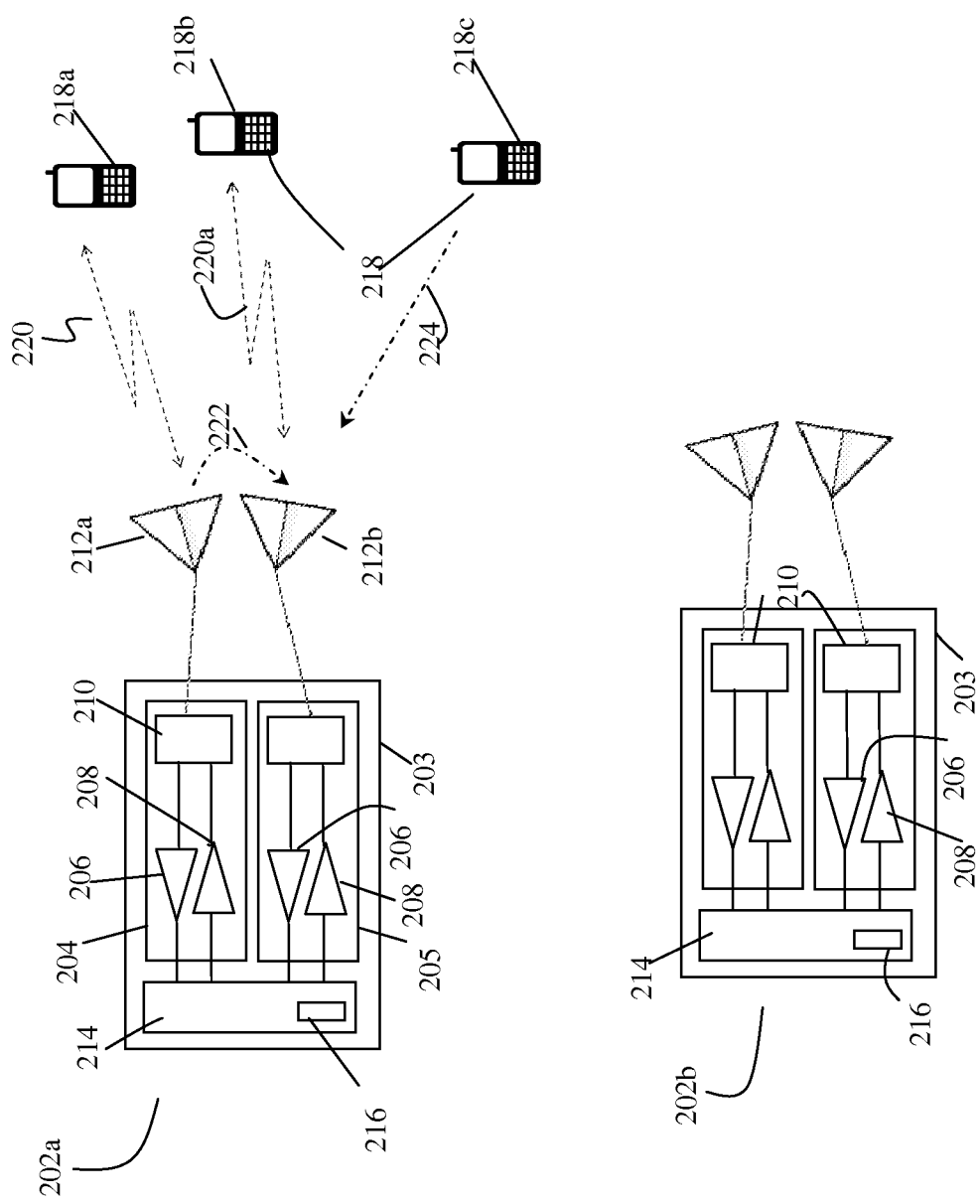
FIG. 2 is a diagram of two transceiver base stations, according to an embodiment of the invention.

FIG. 2 is a diagram of two multibeam base stations, according to an embodiment of the invention. A first base station 202a may include a first transceiver or AP 205 and a second transceiver or AP 204, each co-located to each other in one base station, and may be housed in the same device housing 203. The first transceiver 205 and second transceiver 204 may share a processor 214 and memory 216 to implement software. Alternatively, the first transceiver 205 and second transceiver 204 may each have separate processors and memory, as shown in FIG. 1. Each transceiver may include a transmitter 208, receiver 206, RF interface 210 and antenna 212. Each transceiver may be configured to transmit data to at least one UE 218 on a directed beam 220. Data may be transmitted according to a CSMA/CA protocol, such as the IEEE 802.11xx protocol. First transceiver 205 and second transceiver 204 may use or share the same frequency resources by being able to communicate on the same frequency or frequency channel.

According to embodiments of the invention, first transceiver 205 may desire to transmit data on a beam 220a with an azimuth directed toward a UE 218, for example. Based on the IEEE 802.11xx standard, first transceiver 205 may, prior to transmitting, determine whether a frequency channel is occupied by another transceiver or access point, or a UE transmitting to first transceiver 205. If processor 214 identifies data transmission 222 on the same or one channel or frequency as transmissions by second transceiver 204 which is co-located with first transceiver 205, processor 214 may allow (e.g., by controlling or sending signals to the transceiver or other equipment) first transceiver 205 to transmit data simultaneously with data transmission by second transceiver 204. If, as an example, base station 202a includes more than two co-located transceivers, processor 214 may allow first transceiver 205 to transmit data simultaneously with two or more of its co-located transceivers, e.g., three or four co-located transceivers may be able to transmit simultaneously. By allowing simultaneous data transmission from or by first transceiver 204 and second transceiver 205, processor 214 may be ignoring the CSMA/CA rules of the IEEE 802.11 protocol for the case of co-located AP transmission. Processor 214 may identify that second transceiver 204 is transmitting, because during data transmission between second transceiver 204 and UE 218a, first transceiver 205 may receive and decode part of that data transmission, such as a signal preamble, for example. A short time after the signal preamble, first transceiver 205 may receive and decode a sender address field that indicates a basic service set identification (BSSID) of a transceiver that transmitted the signal preamble. Processor 214 may compare the received sender address with a stored list of addresses. The stored list of addresses may be stored in memory 216, for example, and may be a list indicating the BSSID's of transceivers co-located with first transceiver 205 (e.g., processor 214 would store the BSSID of second transceiver 204). The list of co-located transceivers may be programmed into memory 216 prior to use of base station 202a, for example. Referring to FIG. 1, the list of addresses indicating BSSID's of co-located transceivers may be stored in each memory 116 of each of the transceivers 102a-d.

In FIG. 2, when processor 214 has determined that a signal preamble is from second transceiver 204 because a sender address of the preamble is included in a stored list of addresses, processor 214 may ignore the CSMA/CA rules, allowing (e.g., by controlling or sending signals to components) simultaneous or concurrent data transmission from first transceiver 205 and second transceiver 204. (Alternatively, an independent processor for a specific transceiver may make such a determination). Processor 214 may be configured to ignore the CSMA/CA rules for co-located transceivers, because each transceiver 204, 205 may be serving individual UE's 218a, 218b on different directional beams, with less likelihood of interference or overloaded bandwidth capacity. Processor 214 may allow or control a transmitter 208 of first transceiver 205 to transmit data to a UE 218 simultaneously with data transmission by the co-located access point, e.g., second transceiver 204.

For other data transmission that is received and decoded by first transceiver 205, processor 214 may follow the CSMA/CA rules of the IEEE 802.11xx standard. For example, UE 218b, which is being served by a beam transmitted by first transceiver 205, may desire to transmit back to first transceiver 205. First transceiver 205 may follow CSMA/CA rules when receiving data from UE 218b, because data transmission from UE 218b would not be identified as coming from second transceiver 204. Therefore, first transceiver 205 may delay transmission until the CCA is deemed clear, e.g., UE has stopped transmitting. In another example, a UE 218c being served by another base station 202b may be near first base station 202a and may transmit data 224 in order to be acknowledged or recognized by first base station 202a. First transceiver may follow CSMA/CA rules when receiving data from UE 218c, because it is not identified as second transceiver 204.

First transceiver 205 and second transceiver 204 of FIG. 2 and transceivers 102a, 102b, 102c, and 102d of FIG. 1 may each include one or more controller(s) or processor(s) 114 and 214, respectively, for executing operations and one or more memory unit(s) 116 and 216, respectively, for storing data and/or instructions (e.g., software) executable by a processor. Processor(s) 114 and 214 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 116 and 216 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Processors may be general purpose processors configured to perform embodiments of the invention by for example executing code or software stored in memory, or may be other processors, e.g. dedicated processors.

Figure 3:
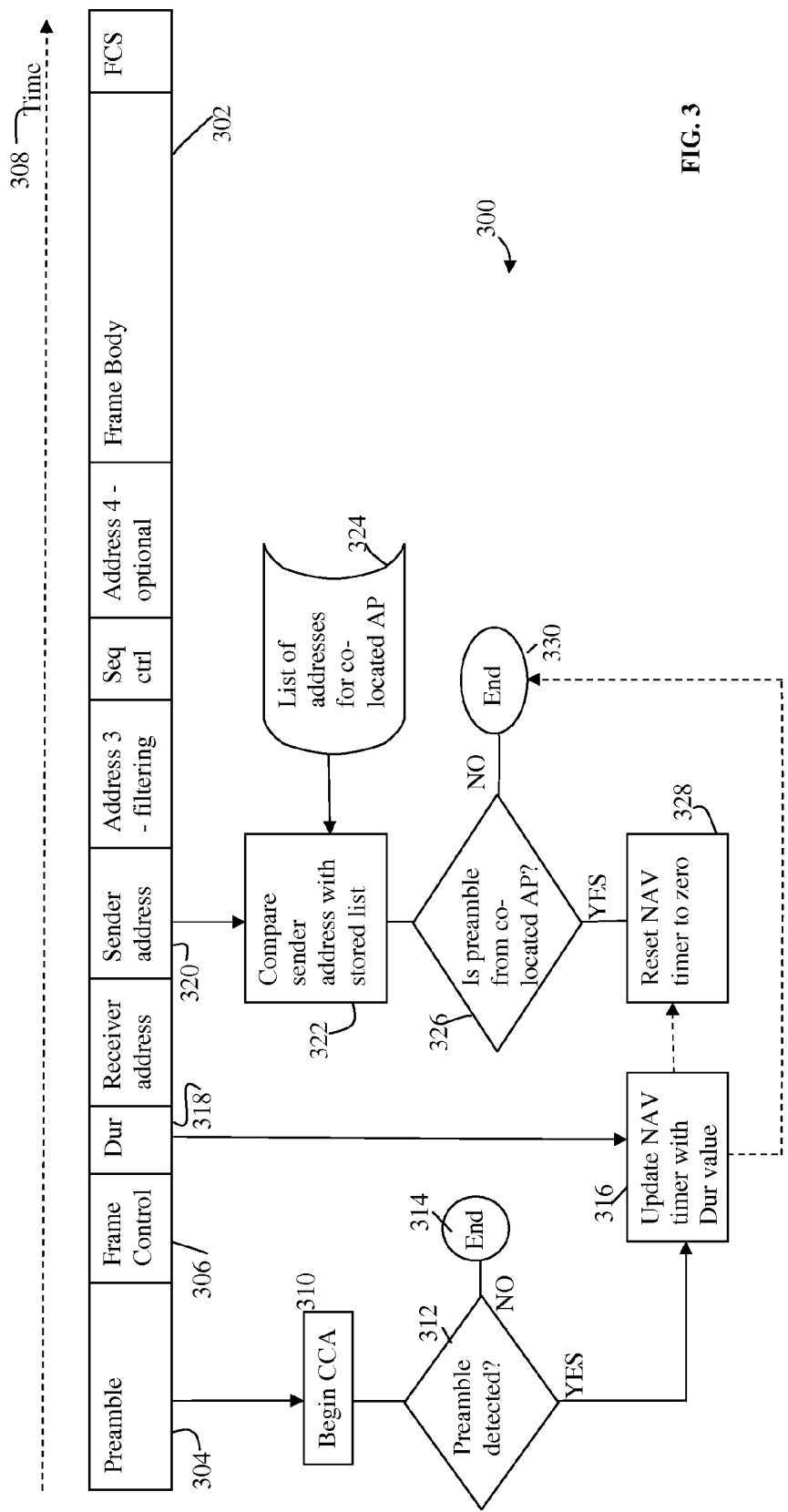
FIG. 3 is a flowchart of a method for detecting a preamble from a co-located transceiver, according to embodiments of the invention.

FIG. 3 is a flowchart of a method 300 for detecting a preamble from a co-located transceiver, according to embodiments of the invention. For a multi-beam access point that includes a plurality of co-located transceivers, one of the transceivers may receive a data packet 302. The data packet may include various data fields as specified by an 802.11 standard protocol, such as a preamble 304 or a frame control 306 field. The data fields of the data packet 302 may be sent serially, as illustrated by the time axis 308. When a data packet 302 is received, detected, or decoded, a CCA may begin 310, in accordance with an 802.11 protocol or other CSMA/CA protocol. A processor may determine whether a preamble has been detected 312. If a preamble has not been detected by the processor, the CCA ends and no further steps are taken 314. If a preamble is detected, the processor may, in accordance with the 802.11 protocol, update the transceiver's NAV timer with a duration value 318 sent after the preamble 304. Ordinarily, this may prevent the transceiver from transmitting for the duration of the NAV timer value (e.g., until the NAV timer runs down to zero). The transceiver may then receive data field describing a sender address 320 of the preamble 304. A processor may compare 322 the received sender address with a stored list of addresses 324. The addresses may describe the BSSID's of all the transceivers co-located with the transceiver. The processor may determine 326 whether the preamble 304 is from a co-located transceiver or AP. If the list of stored addresses includes the sender address 320, the processor may determine that the preamble 304 is from a co-located transceiver and reset 328 the transceiver's NAV timer to zero. This may prevent the transceiver from unnecessarily delaying data transmission due to a co-located transceiver's transmission to a separate user equipment. If the list of stored addresses does not include the sender address 320, then the processor may determine that the preamble 304 is not from a co-located transceiver. In this case, the data packet 302 may be from a user equipment that attempting to transmit to the transceiver. The processor may not take any further steps 330, and the NAV timer may continue to count down as per a typical CCA.

Figure 4:
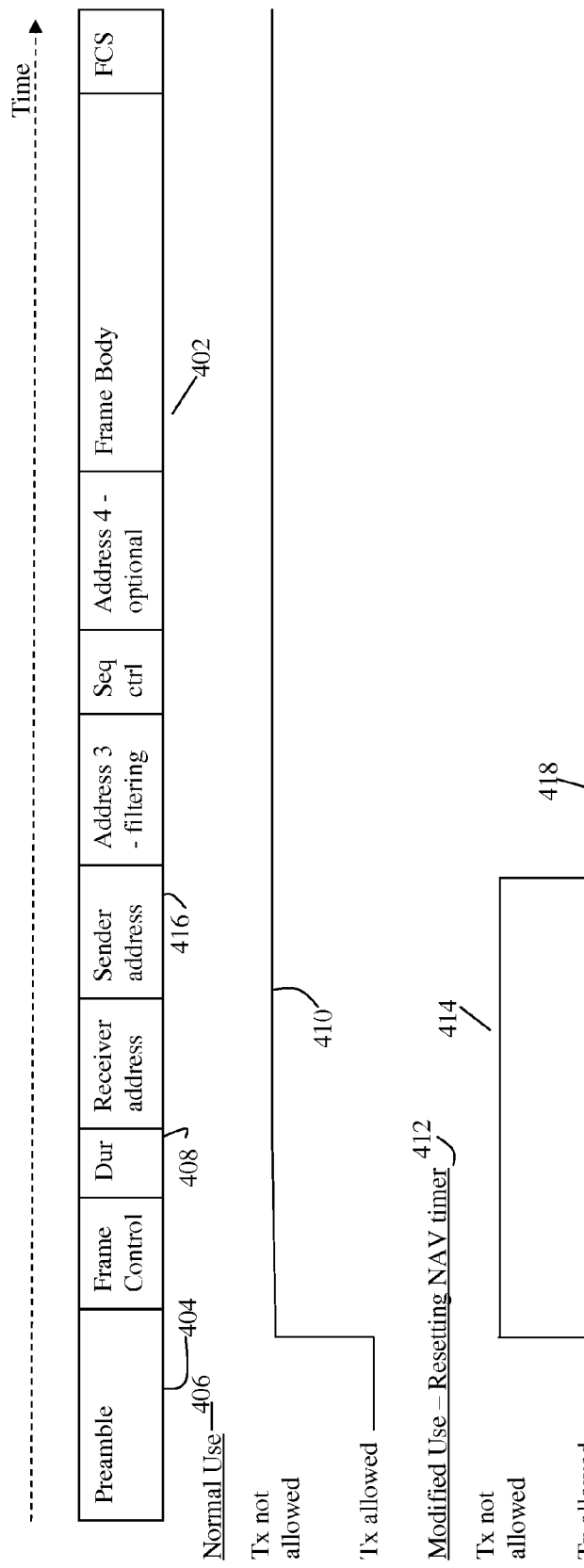
FIG. 4 is a timeline illustrating a transceiver's ability to transmit data according to embodiments of the invention.

FIG. 4 is a timeline illustrating a transceiver's ability to transmit data according to embodiments of the invention. Embodiments of the invention may allow a transceiver in a multi-beam access point to transmit data more often than normal use would allow. As with FIG. 3, above, a transceiver may receive a data packet 402 with a preamble 404. The preamble 404 may trigger a CCA. In normal use 406, once a duration value 408 is received, the transceiver's NAV timer may be updated with the duration value 408. The duration value 408 may be the length of time for the entire data packet 402 to be transmitted. The NAV timer may count down for that length of time, and the transceiver may not be able to transmit 410. This would occur whether the data packet 402 is transmitted by a user equipment or another co-located transceiver. In modified use, where a NAV timer is reset, 412, the NAV timer may update its value to the duration value 408, similar to normal use 406. As the NAV timer immediately counts down, the transceiver may not be able to transmit 414. However, the transceiver may decode or receive the sender address 416 of the preamble 404 and determine that the sender of the preamble is a co-located transceiver. If so, the NAV timer may be reset to zero, and the transceiver may be able to transmit 418. As illustrated in the differences between normal use 406 and modified use 412, the transceiver is able to transmit for a longer period of time with modified use 412 than with normal use 406. Different versions of 802.11 may having different timing parameters for when a sender address is decoded and the NAV timer is reset. For 802.11a, g, n, ac in orthogonal frequency-division multiplexing (ODFM) mode, the NAV timer may be reset at approximately 20 μsec after the preamble 404 is initially detected. For 802.11b, g, n, ac in direct-sequence spread spectrum (DSSS) mode, the NAV timer may be reset at approximately 212 μsec after the preamble 404 is initially detected.

Figure 5:
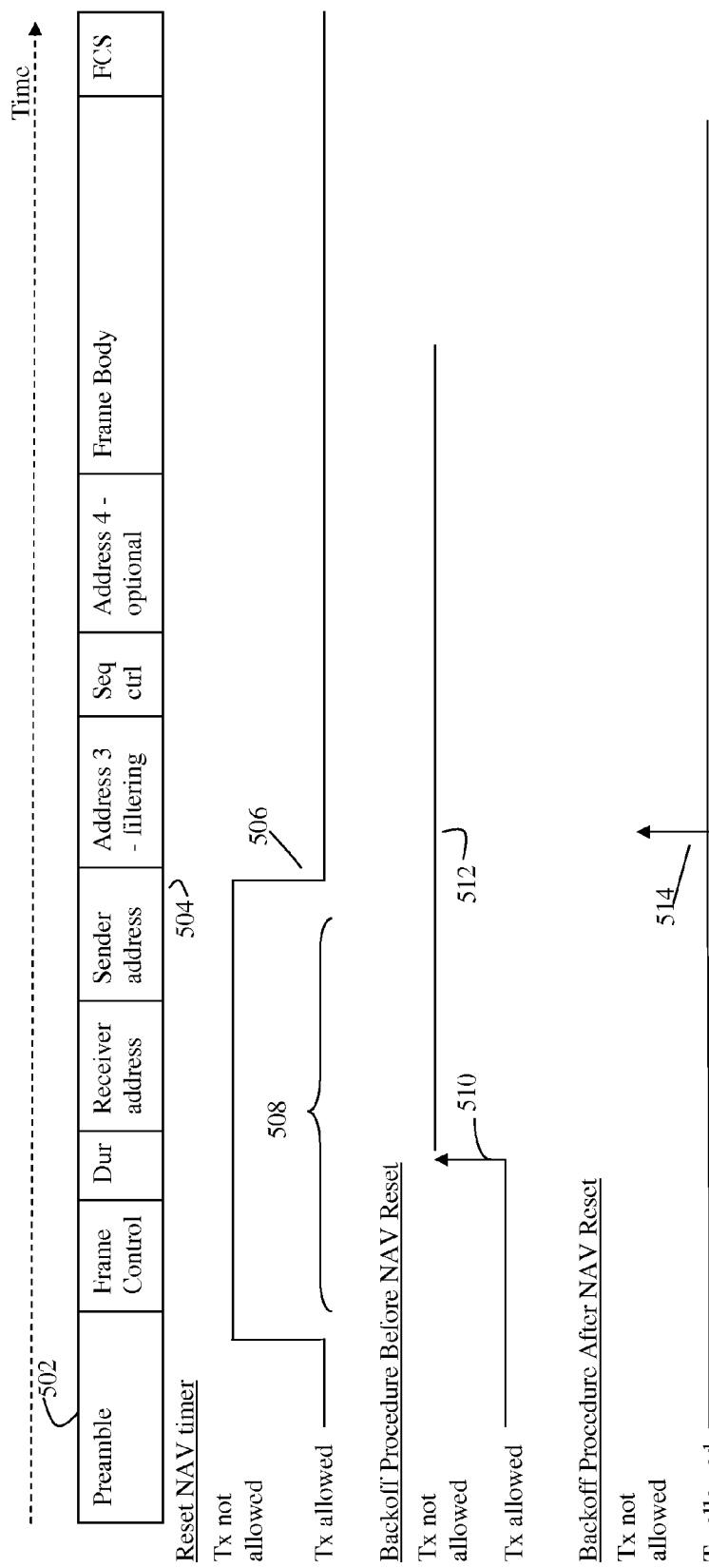
FIG. 5 is a timeline of a backoff procedure, according to embodiments of the invention.

FIG. 5 is a timeline of a backoff procedure, according to embodiments of the invention. As described previously, a backoff procedure may be implemented by transceivers in accordance with an 802.11 protocol. Even with a modified CSMA/CA protocol by resetting the NAV timer, this may introduce a random amount of unnecessary time delay if the backoff procedure is activated due the detection of data transmission from a co-located transceiver. For example, one transceiver may reset its NAV timer 506 when it determines that a preamble 502 is transmitted from a co-located transceiver (e.g., the sender address 504 of the preamble 502 is included in a stored list of addresses). This may still leave a time period where data transmission is not allowed 508. For example, a processor in the transceiver may send a "No-Tx" control signal to its receiver. The transceiver may nevertheless desire to transmit to a user equipment, for example, and may check the channel 510 during the time when transmission is not allowed. The transceiver may determine that the channel is busy and initiate a backoff procedure, setting a backoff timer 512 for a random amount of time. The backoff timer may need to count down to zero before the transceiver checks the channel again. Thus, even if a NAV timer is reset and the CCA is ignored, the backoff procedure may still introduce transmission delay. In contrast, if the transceiver checks the channel after the sender address 504 is determined to be from a co-located transceiver, the backoff procedure will not activate, because the channel is not determined to be busy. To minimize the effect of the backoff procedure, embodiments of the invention may track the activation status of the backoff procedure and suppress the backoff procedure, as further explained below.

Figure 6:
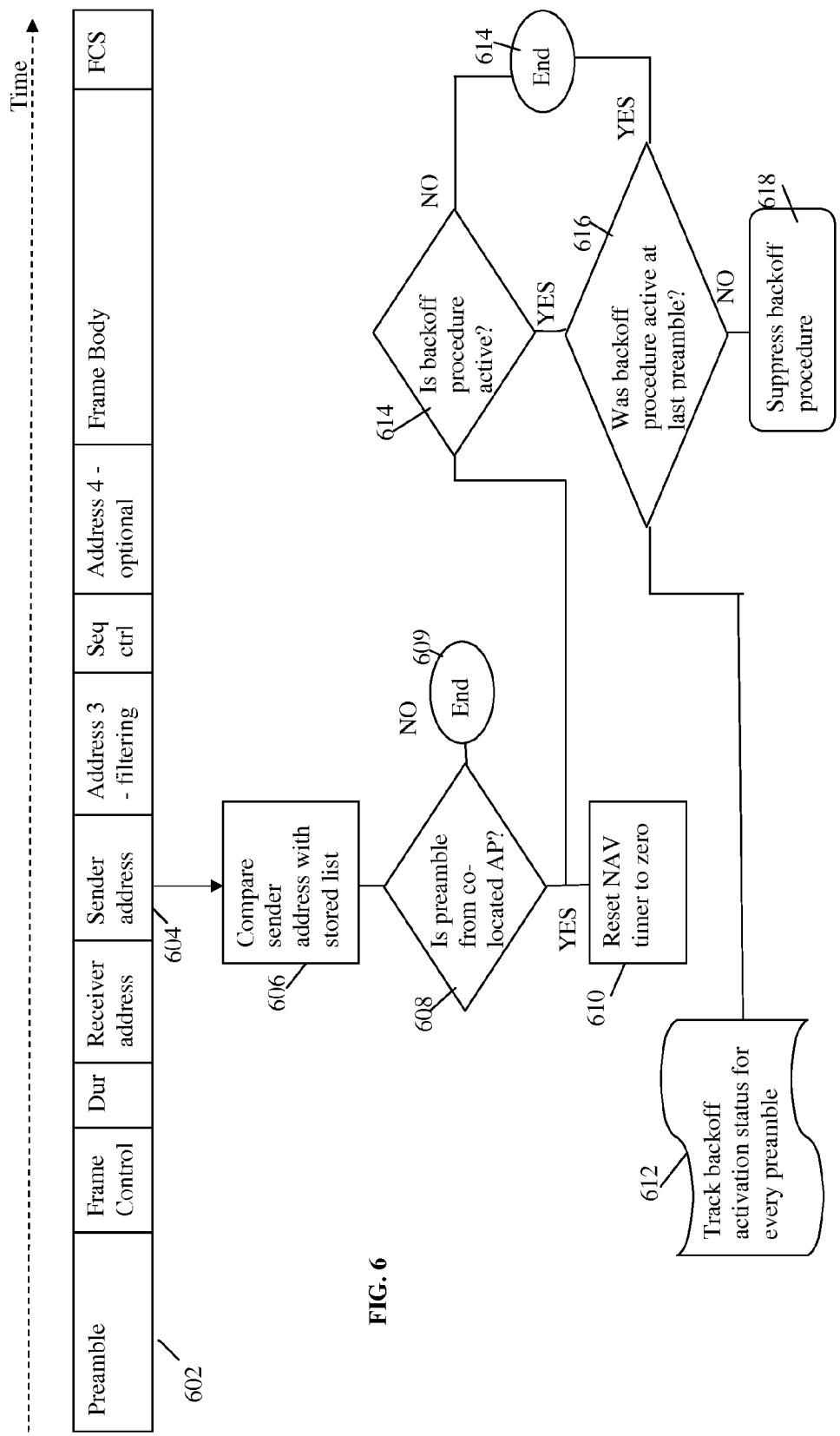
FIG. 6 is a method of suppressing a backoff procedure, according to embodiments of the invention.

FIG. 6 is a method of suppressing a backoff procedure, according to embodiments of the invention. A transceiver may receive a preamble 602 with a sender address 604 of a co-located transceiver. As previously explained in FIG. 3, the sender address 604 is compared 606 with stored list of addresses, and the transceiver's processor determines 608 whether the preamble is from a co-located transceiver. If so, the transceiver's NAV timer is reset to zero. If not, the routine or method ends 609 and no further steps are taken (e.g., the NAV timer is not reset or modified and it continues to count down). Separately, the transceiver may keep track 612, in memory, the activation status of a backoff procedure for each preamble that the transceiver receives. The status may be tracked as on or off, and a time stamp or numerical order of the statuses may be maintained, for example. When the preamble is determined to be from a co-located transceiver, the transceiver may also determine 614 whether the backoff procedure is currently active or on (e.g., at ref. 510 in FIG. 5 when the transceiver checked the channel before the NAV timer had been reset and initiated the backoff procedure). If the backoff procedure is not currently active, then no further steps may be taken 616. If the backoff procedure is currently active, the processor may determine 616 whether the backoff procedure was active during the previous transmission of a preamble 602 and data packet. The processor may retrieve, from memory, the activation status of the backoff procedure that was last logged or tracked. If the backoff procedure was not active at the previous preamble, this may mean that the backoff procedure most recently activated during the time when the NAV timer was not yet reset. Thus, the transceiver may suppress 618 the backoff procedure. The backoff procedure may be suppressed, for example, by resetting a backoff timer to zero. If the backoff procedure was activated at the previous preamble, no further steps 614 may be taken and the backoff procedure may continue to run. Other ways of suppressing the backoff procedure from interfering with simultaneous data transmission may be used.

FIG. 7 is a flowchart for a method according to an embodiment of the invention. In operation 702, a multibeam access point may include a plurality of transceivers co-located with each other, and using the same communications resources, the plurality of transceivers may transmit data, such as to user equipment, according to a collision sense multiple access/collision avoidance (CSMA/CA) protocol. The first and second transceiver may communicate according to, for example, the IEEE 802.11 protocol, which uses the CSMA/CA rules. The CSMA/CA rules may require a CCA prior to transmitting data or a NAV timer update to provide a countdown to when a transceiver may begin transmitting. In operation 704, a receiver on a device or a processor may receive a signal preamble and a sender address of the signal preamble. In operation 706, the processor may determine whether the sender address is included in a list of stored addresses. The addresses may be loaded to memory prior to activation of the multibeam access point. In operation 708, a processor may allow simultaneous data transmission from two or more of the co-located transceivers, if the sender address is included in the stored list of addresses. The processor may, for example, control or send signals to a transmitter in the first transceiver such that data is transmitted at the same time as data is transmitted by the second transceiver. Allowing simultaneous data transmission from two or more of the co-located transceivers may ignore CSMA/CA rules which prevent or suppress simultaneous transmission. The processor may ignore CSMA/CA rules by resetting a NAV timer or resetting a backoff timer, for example.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

In various embodiments, computational modules may be implemented by e.g., processors (e.g., a general purpose computer processor or central processing unit executing software), or digital signal processors (DSPs), or other circuitry. The baseband modem may be implanted, for example, as a DSP. A beamforming matrix can be calculated and implemented for example by software running on general purpose processor. Beamformers, gain controllers, switches, combiners, and phase shifters may be implemented, for example using RF circuitries.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A wireless communication system comprising:
   a plurality of transceivers co-located to each other and each configured to transmit data to at least one user equipment using the same frequency channel, according to a collision sense multiple access/collision avoidance (CSMA/CA) protocol, wherein the co-located transceivers are grouped together into one base station;
   a processor to:
      initiate a clear channel assessment upon receipt of a data packet;
      determine whether a signal preamble is present in the data packet;
      if the signal preamble is not present in the data packet, terminate the clear channel assessment; and
      if the signal preamble is present in the data packet:
         a) update a Network Allocation Vector (NAV) with a duration value from the received data packet,
         b) receive a sender address of the signal preamble,
         c) determine whether the preamble is from a co-located transceiver based on whether the sender address is included in a stored list of addresses of co-located transceivers, and
         d) allow simultaneous data transmission from two or more of the co-located transceivers, if the sender address is included in the stored list of addresses by resetting the NAV timer to zero.

2. The wireless communication system of claim 1, wherein the processor is to allow simultaneous data transmission from two or more of the co-located transceivers by suppressing activation of a backoff procedure.

3. The wireless communication system of claim 2, wherein the processor is to suppress activation of the backoff procedure by resetting a backoff timer to zero.

4. The wireless communication system of claim 1, wherein the processor is to track an activation status of a backoff procedure for at least two consecutive signal preambles received.

5. The wireless communication system of claim 4, wherein the processor is to suppress activation of a backoff procedure if, during a previous preamble, the activation status of a backoff procedure was off.

6. The wireless communication system of claim 4, wherein the processor is to allow activation of a backoff procedure if, during a previous preamble, the activation state of a backoff procedure was on.

7. The wireless communication system of claim 1, wherein each of the plurality of transceivers are isolated from each other by a minimum of −100 dBm.

8. A method of wireless communication, comprising:
   transmitting data, by a plurality of transceivers co-located to each other and using the same frequency channel, according to a collision sense multiple access/collision avoidance (CSMA/CA) protocol, wherein the co-located transceivers are grouped together into one base station;

initiating, by a processor, a clear channel assessment upon receipt of a data packet;

determining, by the processor, whether a signal preamble is present in the data packet;

if the signal preamble is not present in the data packet, terminate, by the processor, the clear channel assessment; and if the signal preamble is present in the data packet:
  a) updating, by the processor, a Network Allocation Vector (NAV) with a duration value from the received data packet;
  b) receiving, by the processor, a sender address of the signal preamble;
  c) determining, by the processor, whether the preamble is from a co-located transceiver based on whether the sender address is included in a stored list of addresses of co-located transceivers; and
  d) allowing simultaneous data transmission from two or more of the co-located transceivers, if the sender address is included in the stored list of addresses by resetting the NAV timer to zero.

9. The method of claim 8, wherein allowing simultaneous data transmission from two or more of the co-located transceivers comprises suppressing activation of a backoff procedure.

10. The method of claim 9, wherein suppressing activation a backoff procedure comprises resetting a backoff timer to zero.

11. The method of claim 8, comprising tracking an activation state of a backoff procedure for at least two consecutive signal preambles received.

12. The method of claim 8, comprising suppressing a backoff procedure if, during a previous preamble, the activation status of a backoff procedure was off.

13. The method of claim 12, comprising allowing a backoff procedure if, during a previous preamble, the activation status of a backoff procedure was on.

14. An access point device, comprising:
  a transmitter configured to transmit data according to a collision sense multiple access/collision avoidance (CSMA/CA) protocol;
  a receiver configured to:
    update a Network Allocation Vector (NAV) with a duration value from a received data packet,
    initiate a clear channel assessment upon receipt of a data packet,
    determine whether a signal preamble is from a co-located transceiver based on whether the signal preamble is present in the data packet wherein the co-located transceivers are grouped together into one base station,
    if the signal preamble is not present in the data packet, terminate the clear channel assessment, and
    if the signal preamble is present in the data packet receive a sender address of the signal preamble; and
  a processor configured to reset a NAV timer to zero of said access point if the sender address is included in a stored list of addresses of co-located co-channel access points.

15. The access point device of claim 14, wherein the list of addresses include the BSSID of each of the co-located access points.

16. The access point device of claim 14, wherein the processor is to track an activation status of a backoff procedure for every preamble received.

17. The access point device of claim 14, wherein the processor is to suppress a backoff procedure if the sender address is included in said stored list of addresses.

* * * * *